United States Patent
Norum

(10) Patent No.: US 7,007,566 B2
(45) Date of Patent: Mar. 7, 2006

(54) ACTUATOR FOR A MOTOR VEHICLE TRANSMISSION

(75) Inventor: Viggo L. Norum, Kongsberg (NO)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/644,580

(22) Filed: Aug. 20, 2003

(65) Prior Publication Data

US 2004/0116229 A1 Jun. 17, 2004

Related U.S. Application Data

(63) Continuation of application No. PCT/DE02/00542, filed on Feb. 15, 2002.

(30) Foreign Application Priority Data

Feb. 20, 2001 (DE) ............................... 101 07 852

(51) Int. Cl.
*F16H 55/02* (2006.01)

(52) U.S. Cl. ...................... 74/335; 74/89.29; 74/89.34; 74/424.75; 74/424.95; 74/473.36

(58) Field of Classification Search ................... 74/33, 74/473.1, 473.12, 473.36, 89.29, 89.3, 89.34, 74/424.75, 424.94, 424.95

See application file for complete search history.

(56) References Cited

U.S. PATENT DOCUMENTS

| 4,031,765 | A | * | 6/1977 | Metz | 74/57 |
| 4,210,063 | A | * | 7/1980 | Grossman | 74/57 |
| 4,730,503 | A | | 3/1988 | Rosenthal | |
| 5,540,113 | A | * | 7/1996 | Takei | 374/89.3 |
| 5,647,245 | A | * | 7/1997 | Takei | 74/89.3 |
| 5,649,451 | A | * | 7/1997 | Ruland | 74/89.3 |
| 5,704,250 | A | * | 1/1998 | Black | 74/89.3 |
| 6,788,435 | B1 | * | 9/2004 | Ouchi et al. | 358/474 |

FOREIGN PATENT DOCUMENTS

| DE | 39 38 353 A1 | 5/1990 |
| DE | 197 34 023 A1 | 2/1998 |
| EP | 0 636 819 B1 | 2/1995 |
| EP | 1 001 193 A2 | 10/1999 |

* cited by examiner

*Primary Examiner*—Ha Ho
(74) *Attorney, Agent, or Firm*—Darby & Darby

(57) ABSTRACT

An actuator for an automated transmission in a motor vehicle drive train has a central actuating shaft with a shift finger. Two sleeves are supported concentrically on the actuating shaft and can be driven in mutually independent rotation. Two grooves of opposite helical pitch are arranged on the actuating shaft, and each of the sleeves has at least one inward-directed guide pin engaging one of the grooves.

6 Claims, 6 Drawing Sheets

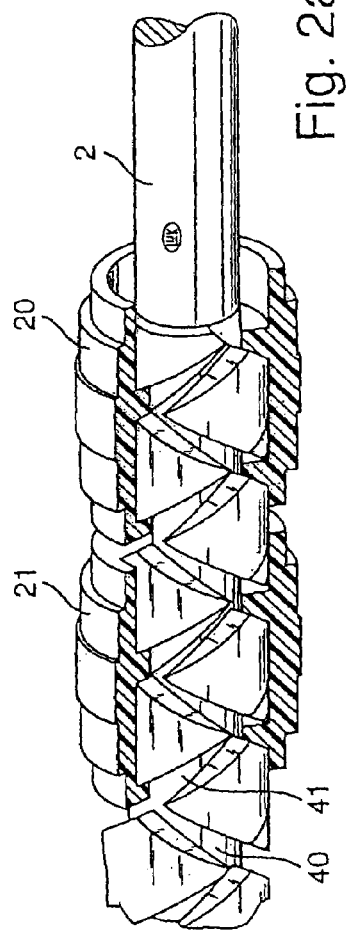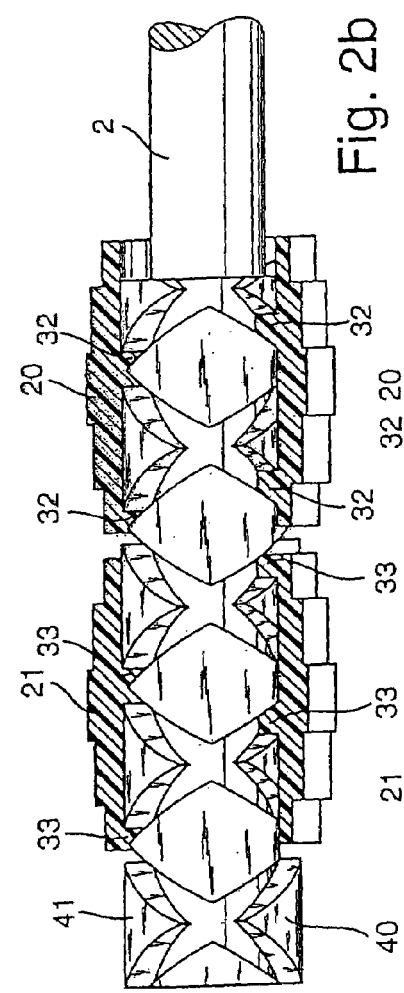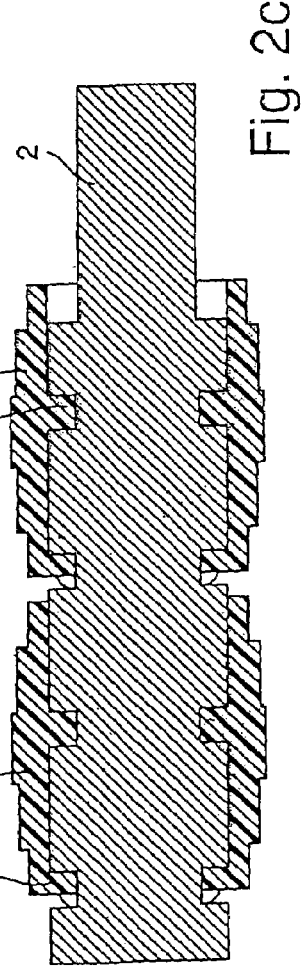

ACTUATOR FOR A MOTOR VEHICLE TRANSMISSION

CROSS-REFERENCE TO RELATED APPLICATION

This application is a continuation of International Patent Application Serial No. PCT/DE02/00542, filed Feb. 15, 2002, published in German, which is hereby incorporated by reference in its entirety.

BACKGROUND OF THE INVENTION

The invention relates to an actuator, specifically for the automated actuation of an automated transmission of a motor vehicle. The invention further relates to a method for controlling the actuator.

Actuators of this type belong to the known state of the art. In DE 19734023, for example, a shift finger in an automated transmission is actuated by two motors, one of which drives the axial movement of the shift finger and the other drives the rotation of the shift finger relative to a shaft. While either of the motors is running, the other motor always rests. As a result, the two motors have to be relatively large, because each must be capable of delivering the required actuating force for the respective movement of the shift finger.

OBJECT AND SUMMARY OF THE INVENTION

The object of the present invention is to provide an actuator, specifically for an automated transmission, that is distinguished by its simplicity and by a compact arrangement of the actuator motors, while nevertheless delivering the amounts of force required to actuate a transmission.

To meet the foregoing objective, the present invention proposes an actuator for the automated actuation of a transmission in the drive train of a motor vehicle. The actuator according to the invention has a central actuating shaft with a shift finger. Two grooves of opposite helical pitch are arranged on a part of the actuating shaft, and two sleeves that can be driven to rotate independently of one another are arranged essentially concentrically to the actuating shaft. Each of the two sleeves has an internal profile, for example an inward-directed guide pin, which engages one of the grooves.

The stated objective for a transmission actuator with a central actuating shaft and a shift finger can also be attained with two sleeves arranged concentrically on the shaft, where the actuating shaft has an external profile, for example an outward-directed guide pin or preferably two outward-directed guide pins, each of which engages a helical internal groove in one of the two sleeves and where the groove in one sleeve has an opposite helical pitch from the groove in the other sleeve.

In either of the two embodiments of the foregoing description, each of the sleeves is driven by a motor, which may be an electric, hydraulic or pneumatic motor.

It is advantageous to arrange a gear mechanism between the drive motor and its respective sleeve.

It is further advantageous if the grooves in the shaft are configured with a clockwise helix pitch for one of the grooves and a counter-clockwise pitch for the other.

It is also advantageous for the two grooves to be arranged in adjacent axial sections of the shaft. According to a further exemplary embodiment, the two grooves are arranged at least in part in the same axial section of the shaft.

BRIEF DESCRIPTION OF THE DRAWINGS

The invention will be described in greater detail, with reference to the exemplary embodiments illustrated in the drawings, wherein:

FIG. 2a represents a view of a shaft with sleeves, FIG. 2b represents a view of a shaft with sleeves, FIG. 2c represents a cross-sectional view of a shaft with sleeves.

DETAILED DESCRIPTION OF PREFERRED EMBODIMENTS

Figure 1:
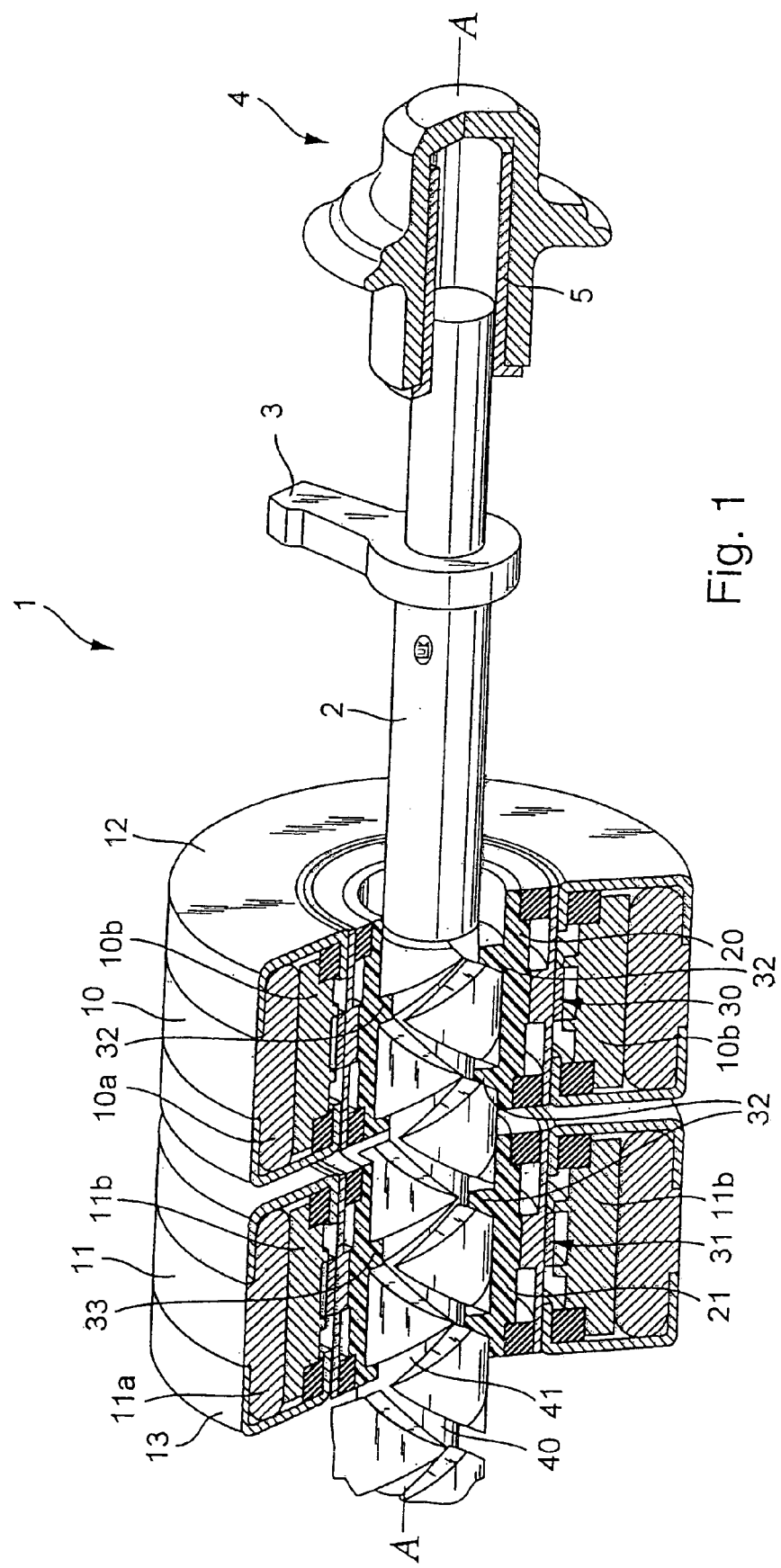
FIG. 1 represents an arrangement of an actuator according to a first embodiment.
Figure 3:
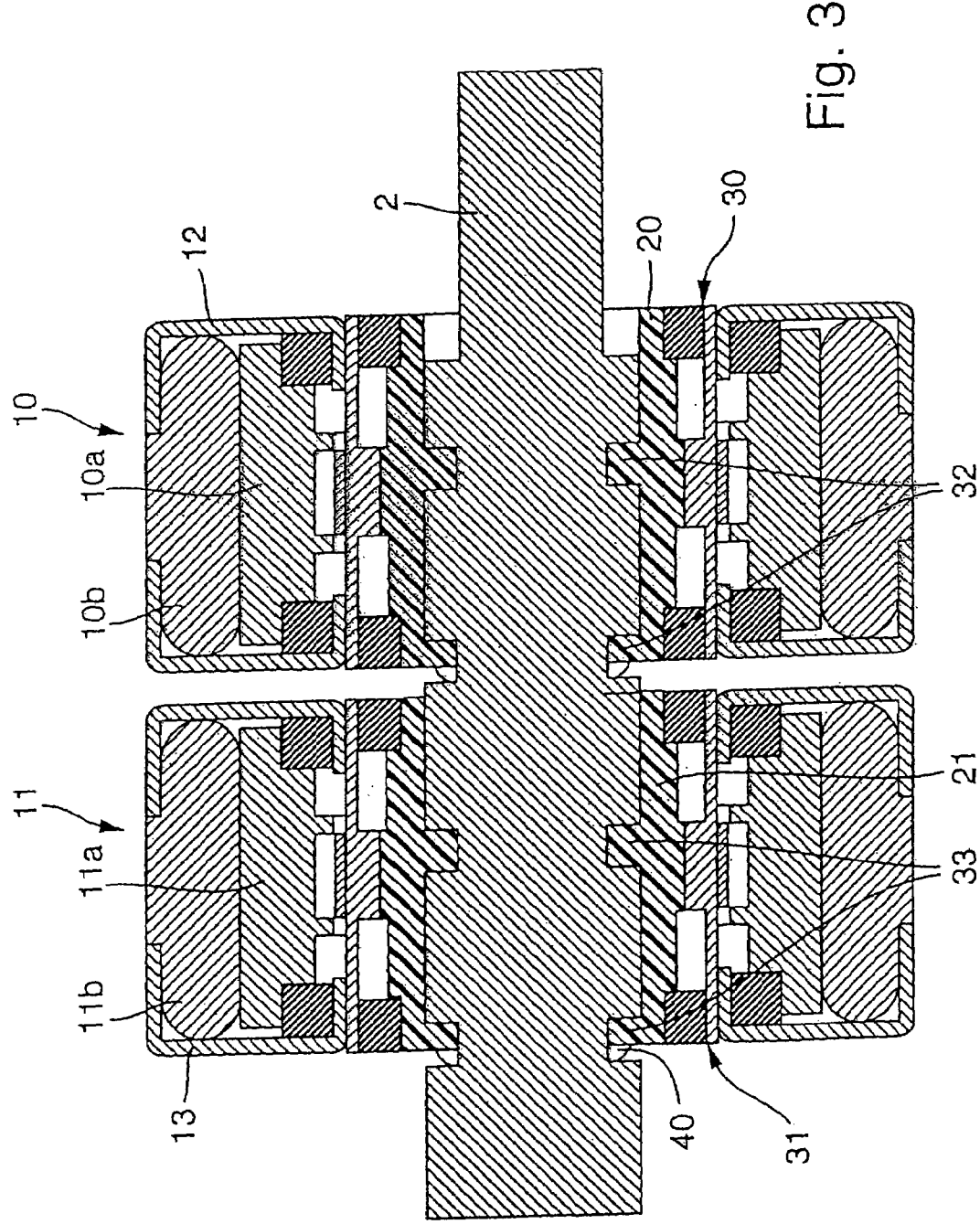
FIG. 3 represents a cross-section of the actuator of FIG. 1.
Figure 6:
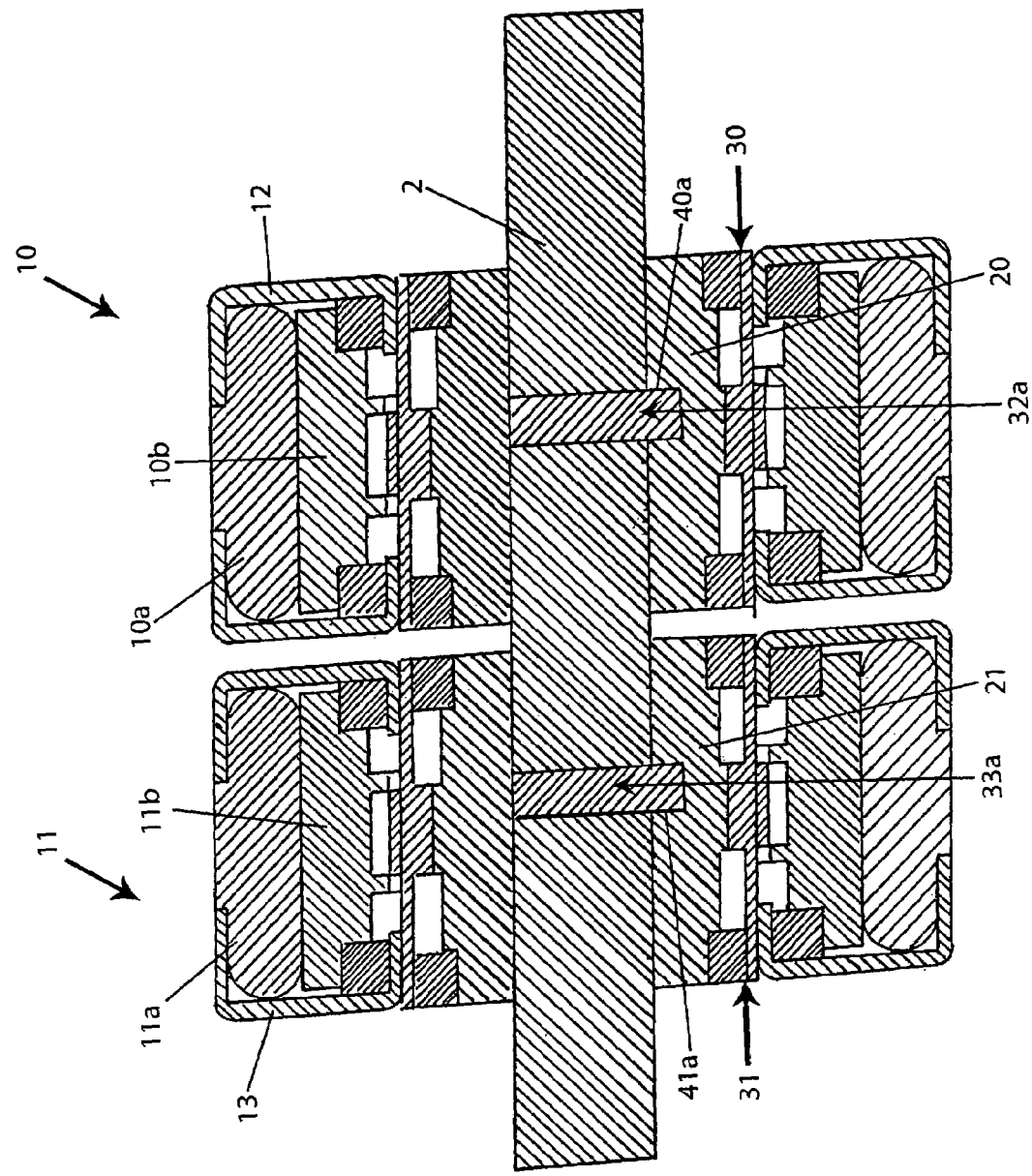
FIG. 6 represents a cross-section of an actuator according to another embodiment.

FIG. 1, FIG. 3 and FIG. 6 show an actuator 1 with a shaft 2 and a shift finger 3. The shift finger can be shifted in an axial direction A—A and can be rotated relative to the axis A—A. The shaft 2 is supported in the bearing 4 with rotational as well as axial mobility. To this end, a sliding sleeve 5 is arranged in a bearing seat 4, which can be permanently connected to the transmission housing. The shaft 2 is equipped at one end with an arrangement of drive motors 10, 11, which can be energized by an electronic control unit to drive the axial and rotational movements of the shaft 2 or shift finger 3.

In the embodiment of FIG. 1, the drive motors 10, 11 are designed as electric motors arranged coaxially to the shaft 2, each motor being equipped with a stator 10a, 11a, and a rotor 10b, 11b. Energizing the electric motors causes the rotors 10b, 11b to rotate about the axis A. The stators 10a, 11a are connected to the motor housings 12, 13, respectively, which in turn can be mounted through a fixed connection to the transmission housing.

Each of the rotors 10b and 11b drives a sleeve 20, 21 by way of a gear mechanism 30, 31. The gear mechanism is designed advantageously with a high reduction ratio. So-called Harmonic Drive mechanisms are well suited for this application, as are spur gear mechanisms, planetary mechanisms, or worm gear mechanisms in other embodiments. In each case the gear mechanism 30, 31 is advantageously arranged in the radial space between the rotor and the sleeve. With the independent control of the two drive motors, the sleeves 20 and 21 can be turned independently of one another. Thus they can be turned, e.g., with the same sense of rotation or with the opposite sense of rotation. The sleeves can also be driven independently at different rpm-rates.

The shaft 2 of the actuator has two grooves 40 and 41 at one end, arranged on the shaft circumference with a helical pitch, where one groove runs with a clockwise pitch and the other groove runs with a counterclockwise pitch. In the arrangement of FIG. 1, the opposite helical pitches of the grooves are such that the two grooves cross each other several times. In another embodiment, the grooves may be arranged in different axial sections of the shaft so that they will not cross each other. The grooves can also be advantageously arranged such that they partially share one section of the shaft and only a part of each groove extends alone over an axial section of the shaft. The grooves are advantageously designed with a substantially rectangular cross-section and serve as a constraining guide for elements such as pins, rollers, or fingers that engage in the grooves.

As an example, the sleeves 20 and 21 have inward-directed guide pins 32 and 33 which may be round or elongated in cross-section, which are constrained by the grooves so that they can only move along the grooves. It is advantageous if each sleeve 20, 21 has at least one guide pin engaged in one groove. For improved guiding properties, it may also be advantageous to use a design where two or more guide pins are engaged in each groove.

Rotating the two sleeves 20 and 21 in the same direction produces a rotation of the shaft, while rotating the sleeves in opposite directions imparts an axial movement to the shaft.

FIGS. 2*a* through 2*c* again show details of the shaft 2 with the grooves 40, 41 and the sleeves 20, 21, in a perspective view, a side view, and a cross-sectional view, respectively.

Figure 4:
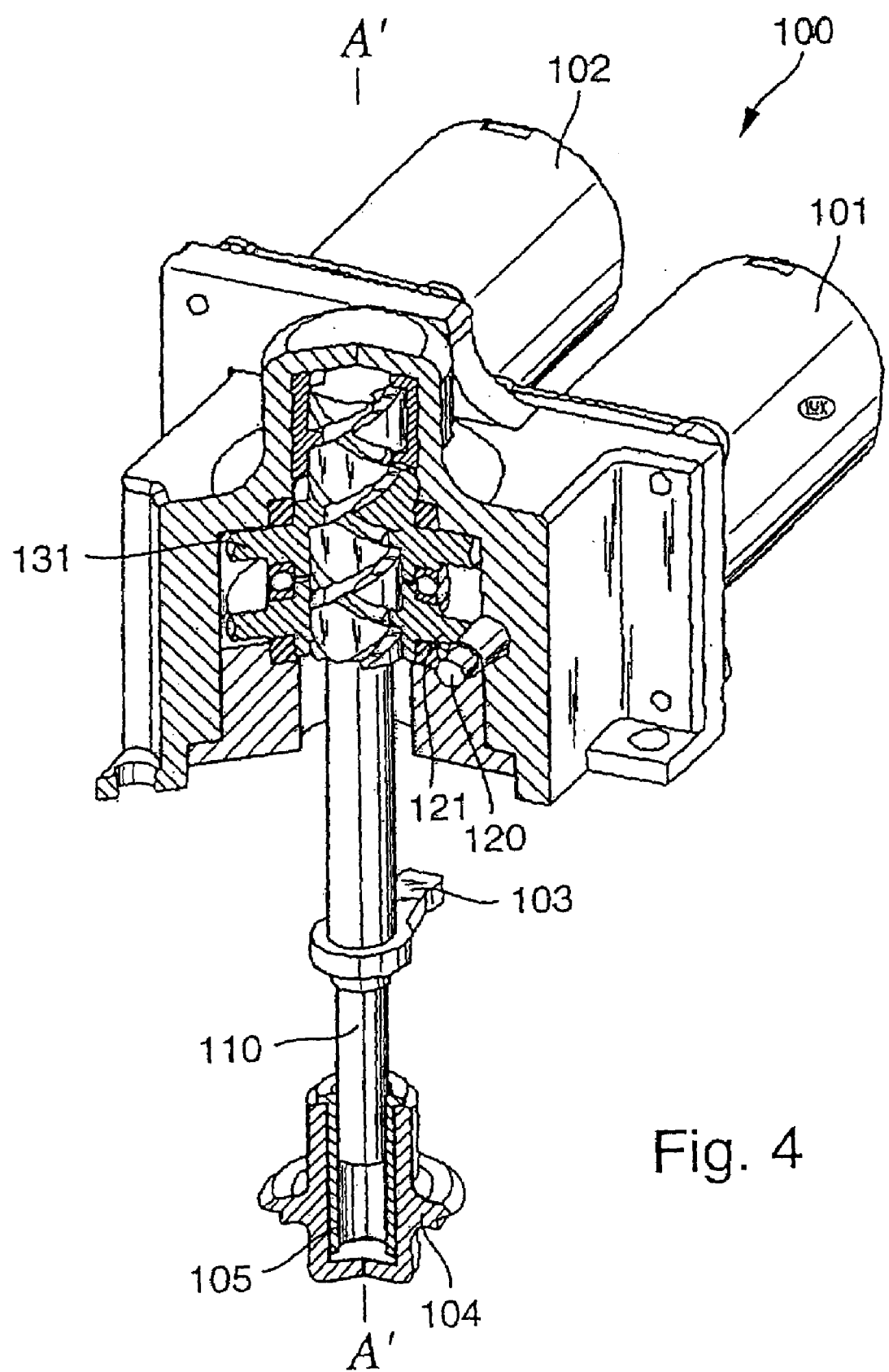
FIG. 4 represents an arrangement of an actuator according to a second embodiment.
Figure 5:
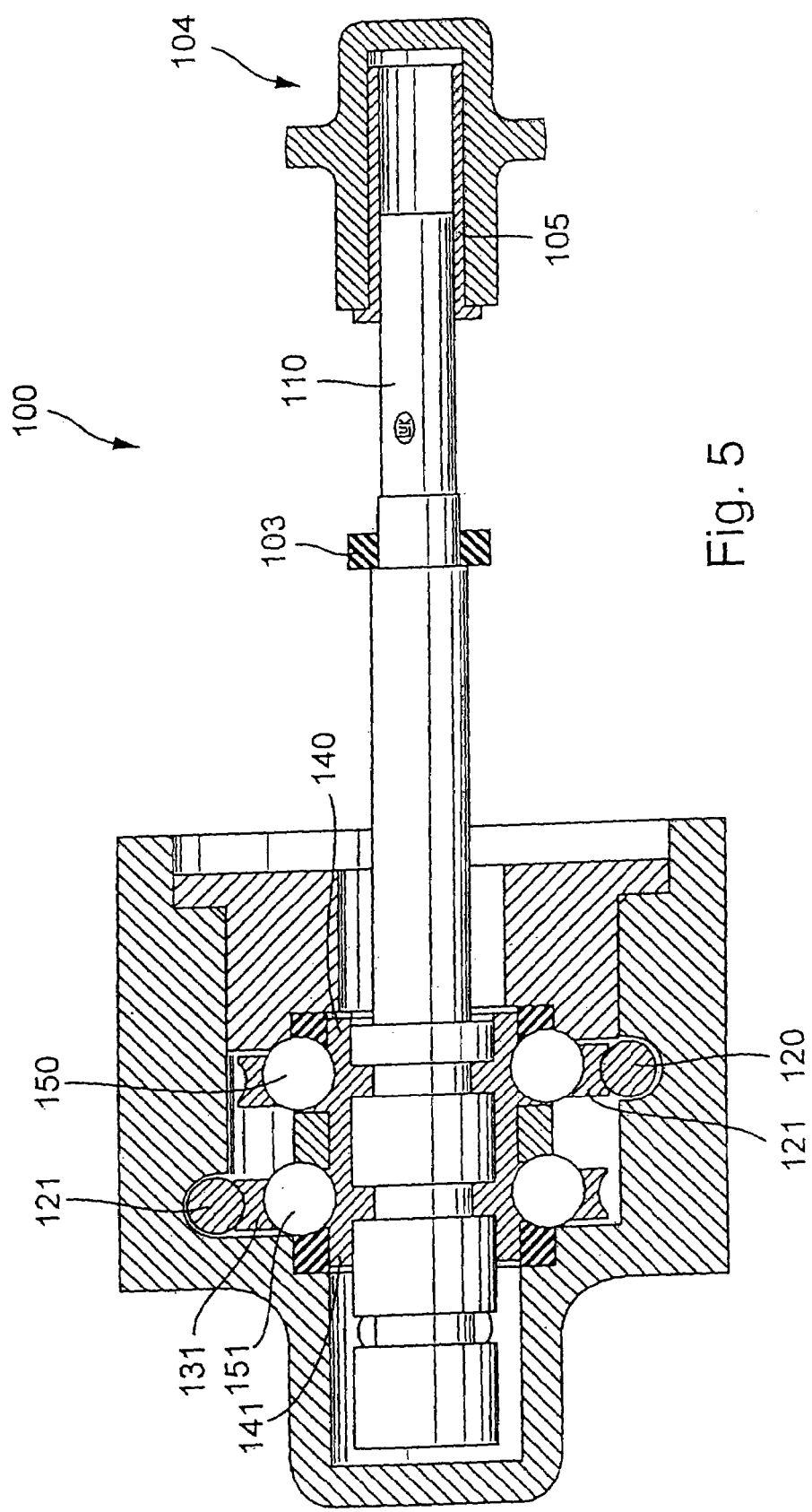
FIG. 5 represents a cross-section of the actuator of FIG. 4.

FIGS. 4 and 5 show another embodiment of an actuator 100 according to the invention wherein, in contrast to the case of FIGS. 1 and 3, the drive motors 101, 102 are not arranged coaxially to the shaft. In this embodiment, the motors 101, 102 are positioned such that the axes of the motors are perpendicular to the axis A'—A' of the shaft 110. In another exemplary embodiment it could also be practical for the axes to be arranged parallel to the axis of the shaft 110, or at an angle that is not equal to 0 or 90 degrees. By turning or axially shifting the shaft 110, the shift finger 103 can be displaced to select a gear. The bearing 104 of the shaft 110 corresponds substantially to the bearing shown in FIG. 1. The same applies to the sliding sleeve 105.

The special advantage of this arrangement is that electric motors are used to drive the sleeves by way of a worm gear mechanism with the worm gears 120, 121 and the spur gears 130, 131. Between the spur gears 130, 131 and the sleeves 140, 141, spring elements 150, 151 can be arranged in the power flow, which will permit a relative displacement of the gears relative to the sleeves against the force of the springs. The details of the sleeves and the guide pins may be taken from the description of FIGS. 1 and 3.

According to a further inventive concept, it can also be practical to arrange the grooves in the sleeves rather than on the shaft, in which case the guide pins would be arranged on the shaft. As shown in FIG. 6, the shaft 2 has outward directed guide pins 32*a* and 33*a*, while the sleeves 20 and 21 have internal helical grooves 40*a* and 41*a* of respectively opposite pitch, with pin 32*a* engaging groove 40*a* and pin 33*a* engaging groove 41*a*.

Without further analysis, the foregoing will so fully reveal the essence of the present invention that others can, by applying current knowledge, readily adapt it for various applications without omitting essential generic or specific features that set the present invention apart from the prior state of the art. Therefore, such adaptations should be understood to fall within the scope and range of equivalence of the appended claims.

What is claimed is:

1. An actuator for an automated transmission in a motor vehicle drive train, comprising:
   a central actuating shaft with a shift finger; two sleeves supported substantially concentrically on the actuating shaft and arranged to be driven in mutually independent rotation about the actuating shaft, wherein two grooves of opposite helical pitch are arranged on the actuating shaft and each of the sleeves has at least one inward-directed guide pin engaging one of the groove, the guide pin being an integral part of the sleeve and thus securely attached thereto;
   two motors driving the independent rotation of the two sleeves, each of the two sleeves being driven by one of the two motors; and
   two reduction gear mechanisms, each of the two gear mechanisms being interposed between one of the two sleeves and one of the two motors.

2. The actuator of claim 1, wherein one of the two grooves has a clockwise helical pitch and the other of the two grooves has a counterclockwise helical pitch.

3. The actuator of claim 2, wherein the two grooves (40, 41) are arranged in adjacent axial sections of the shaft.

4. The actuator of claim 2, wherein at least parts of the two grooves share an axial section of the shaft.

5. The actuator of claim 1, wherein the at least one finger comprises a plurality of fingers integrally formed with one sleeve and axially spaced from one another.

6. An actuator for an automated transmission in a motor vehicle drive train, comprising:
   a central actuating shaft with a shift finger;
   two sleeves supported substantially concentrically on the actuating shaft and arranged to be driven in mutually independent rotation about the actuating shaft, wherein two grooves of opposite helical pitch are arranged on the actuating shaft and each of the sleeves has at least one inward-directed guide pin engaging one of the groove, the guide pin being an integral part of the sleeve and thus securely attached thereto;
   two motors driving the independent rotation of the two sleeves, each of the two sleeves being driven by one of the two motors, wherein axes of the two motors are substantially perpendicular to a longitudinal axis of the central actuating shaft; and
   two reduction gear mechanisms, each of the two gear mechanisms being interposed between one of the two sleeves and one of the two motors.

* * * * *